(12) United States Patent
Yiu et al.

(10) Patent No.: US 12,415,436 B2
(45) Date of Patent: Sep. 16, 2025

(54) NON-WIRE ALTERNATIVES GRID DEFERRALS

(71) Applicant: Rivian IP Holdings, LLC, Plymouth, MI (US)

(72) Inventors: Deidre Yiu, San Francisco, CA (US); David Rothblum, New York, NY (US)

(73) Assignee: Rivian IP Holdings, LLC, Irvine, CA (US)

( * ) Notice: Subject to any disclaimer, the term of this patent is extended or adjusted under 35 U.S.C. 154(b) by 476 days.

(21) Appl. No.: 17/876,430

(22) Filed: Jul. 28, 2022

(65) Prior Publication Data

US 2024/0034176 A1    Feb. 1, 2024

(51) Int. Cl.
| | |
|---|---|
| B60L 53/66 | (2019.01) |
| B60L 53/63 | (2019.01) |
| B60L 53/68 | (2019.01) |
| H02J 3/00 | (2006.01) |

(52) U.S. Cl.
CPC ............ B60L 53/63 (2019.02); B60L 53/66 (2019.02); B60L 53/68 (2019.02); H02J 3/003 (2020.01); *H02J 2203/10* (2020.01)

(58) Field of Classification Search
CPC .......... B60L 53/63; B60L 53/66; B60L 53/68; B60L 53/51; B60L 53/53; B60L 53/305; B60L 53/665; H02J 3/003; H02J 2203/10; H02J 2310/48; H02J 3/14
See application file for complete search history.

(56) References Cited

U.S. PATENT DOCUMENTS

| | | | | |
|---|---|---|---|---|
| 8,872,480 | B2 * | 10/2014 | DeBoer | H02J 7/02 |
| | | | | 320/136 |
| 9,148,027 | B2 * | 9/2015 | Shane | H02J 13/00024 |
| 10,040,363 | B2 * | 8/2018 | Beaston | H02J 3/322 |
| 11,241,975 | B2 * | 2/2022 | Patel | B60L 58/24 |
| 11,524,590 | B2 * | 12/2022 | Billmaier | B60L 53/665 |

(Continued)

FOREIGN PATENT DOCUMENTS

| | | | | |
|---|---|---|---|---|
| CA | 2740480 | A1 * | 11/2011 | ............ B60L 11/123 |
| GB | 2460500 | A * | 12/2009 | .......... B60L 11/1818 |

(Continued)

OTHER PUBLICATIONS

Xiaotian Zhang, Mingli Zhang, Zhe Shi, Jiayi Bi, Research on Influence and Charging Control Strategies of Electric Vehicles Integration into Power Grid, 2018, retrieved from—https://ieeexplore.ieee.org/document/9045310?source=IQplus, 4 pages (Year: 2018).*

(Continued)

*Primary Examiner* — Yongjia Pan
(74) *Attorney, Agent, or Firm* — Patterson + Sheridan, LLP (57) ABSTRACT

Systems and methods for providing energy to an electronic device electrically coupled to a local distribution network are disclosed. In some embodiments, the method comprises determining an energy demand of the local distribution network and determining whether the energy demand exceeds a distribution limit of the local distribution network. In accordance with a determination that the energy demand exceeds the distribution limit, energy, different from energy provided from an external interface of the local distribution network, is provided to the electronic device.

16 Claims, 4 Drawing Sheets

(56) References Cited

U.S. PATENT DOCUMENTS

| | | | | |
|---|---|---|---|---|
| 11,951,863 B2 * | 4/2024 | Lowenthal | | B60L 53/60 |
| 2008/0218121 A1 * | 9/2008 | Gale | | B60W 10/28 |
| | | | | 320/109 |
| 2009/0040029 A1 * | 2/2009 | Bridges | | B60L 55/00 |
| | | | | 340/12.51 |
| 2010/0079004 A1 * | 4/2010 | Keefe | | B60L 53/63 |
| | | | | 307/80 |
| 2011/0204720 A1 * | 8/2011 | Ruiz | | B60L 53/305 |
| | | | | 307/66 |
| 2011/0245987 A1 * | 10/2011 | Pratt | | H02J 7/0068 |
| | | | | 320/132 |
| 2011/0313603 A1 * | 12/2011 | Laberteaux | | H01M 10/48 |
| | | | | 705/412 |
| 2013/0179061 A1 * | 7/2013 | Gadh | | B60L 53/305 |
| | | | | 701/1 |
| 2013/0204471 A1 * | 8/2013 | O'Connell | | B60L 53/68 |
| | | | | 701/22 |
| 2013/0335032 A1 * | 12/2013 | Kuribayashi | | B60L 55/00 |
| | | | | 320/137 |
| 2014/0225564 A1 * | 8/2014 | North | | G05D 1/0291 |
| | | | | 320/109 |
| 2014/0266039 A1 * | 9/2014 | Dougherty | | B60L 53/67 |
| | | | | 320/109 |
| 2015/0102775 A1 * | 4/2015 | Von Novak, III | | B60L 53/63 |
| | | | | 320/109 |
| 2015/0165917 A1 * | 6/2015 | Robers | | B60L 3/12 |
| | | | | 320/109 |
| 2016/0075246 A1 * | 3/2016 | Liptak | | B60L 58/10 |
| | | | | 320/109 |
| 2017/0005515 A1 * | 1/2017 | Sanders | | H02J 3/388 |
| 2017/0015210 A1 * | 1/2017 | Juhasz | | B60L 53/665 |
| 2017/0088001 A1 * | 3/2017 | Haas | | B60L 53/64 |
| 2019/0033353 A1 * | 1/2019 | Quinn | | H02J 13/00028 |
| 2019/0389314 A1 * | 12/2019 | Zhu | | B60L 53/14 |
| 2019/0389315 A1 * | 12/2019 | Zhu | | B60L 53/64 |
| 2021/0061121 A1 * | 3/2021 | Light-Holets | | B60L 55/00 |
| 2021/0221247 A1 * | 7/2021 | Daniel | | G06Q 10/06 |
| 2021/0370794 A1 * | 12/2021 | Dudar | | B60L 53/126 |
| 2022/0105820 A1 * | 4/2022 | Chaudhuri | | B60L 55/00 |

FOREIGN PATENT DOCUMENTS

| | | | | | |
|---|---|---|---|---|---|
| GB | | 2505929 A | * | 3/2014 | B60L 11/1844 |
| TW | | I686032 B | * | 2/2020 | H02J 3/38 |
| WO | WO-2014087426 A2 | | * | 6/2014 | B60L 3/12 |
| WO | WO-2022241267 A1 | | * | 11/2022 | B60L 53/30 |

OTHER PUBLICATIONS

Charger vehicle communications (type 2), Jul. 29, 2021, retrieved from—https://web.archive.org/web/20210729145002/https://www.picoauto.com/library/automotive-guided-tests/charger-vehicle-communications-type-2/, 3 pages (Year: 2021).*

* cited by examiner

NON-WIRE ALTERNATIVES GRID DEFERRALS

INTRODUCTION

As electric vehicle (EV) adoption increases, stress on an electric gird may in turn increase due to increased demand for electricity. Expensive upgrades may need to be performed (e.g., electric utility company installing additional hardware to the grid) to accommodate the increased demand. The costly upgrades may not permanently satisfy the increased demand. The stress on the grid may be based on where the EVs are charging, so the locations of the demand may change, and the costly upgrades may no longer be useful over time. Alternative energy sources such as solar panels may provide additional energy during times of grid stress, but neighborhoods or households without an alternative source of energy would still be affected by grid stress.

BRIEF SUMMARY

The systems and methods disclosed herein relieve stress on an electric grid by providing energy generated independently of a local distribution network. In some embodiments, an electrical system (e.g., an electric vehicle to be charged) is electrically coupled to a local distribution network. In accordance with a determination that the energy demand of the local distribution network exceeds a distribution limit, an indication to provide energy to the electrical system may be transmitted. The provided energy may be generated independently of the local distribution network.

The embodiments disclosed above are examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The systems and methods disclosed herein relieve stress on an electric grid by providing energy generated independently of a local distribution network. In some embodiments, an electrical system (e.g., an electric vehicle to be charged, an electronic device configured to receive energy for operation) is electrically coupled to a local distribution network. In accordance with a determination that the energy demand of the local distribution network exceeds a distribution limit (e.g., energy demand of the local distribution network is high, stress on the electric grid is high), an indication to provide energy to the electrical system may be transmitted. The provided energy may be generated independently of the local distribution network.

Stress on an electric gird may increase due to increased demand for electricity. The disclosed systems and methods may allow the demand for electricity to be satisfied while relieving stress on the electric grid. By satisfying the demand and relieving stress on the electric grid, expensive upgrades (e.g., electric utility company installing additional hardware to the grid) may be forgone. In some embodiments, locations of the demand may change (e.g., based on where EVs are charging, based on conditions such as weather, current events). The disclosed systems and methods may allow energy demand to be satisfied and grid stress to be relieved for different locations. In some embodiments, the disclosed systems and methods allow energy to be provided to a neighborhood or a household with limited or no alternative sources of energy, satisfying the neighborhood or the household's demand during times of grid stress.

Figure 1:
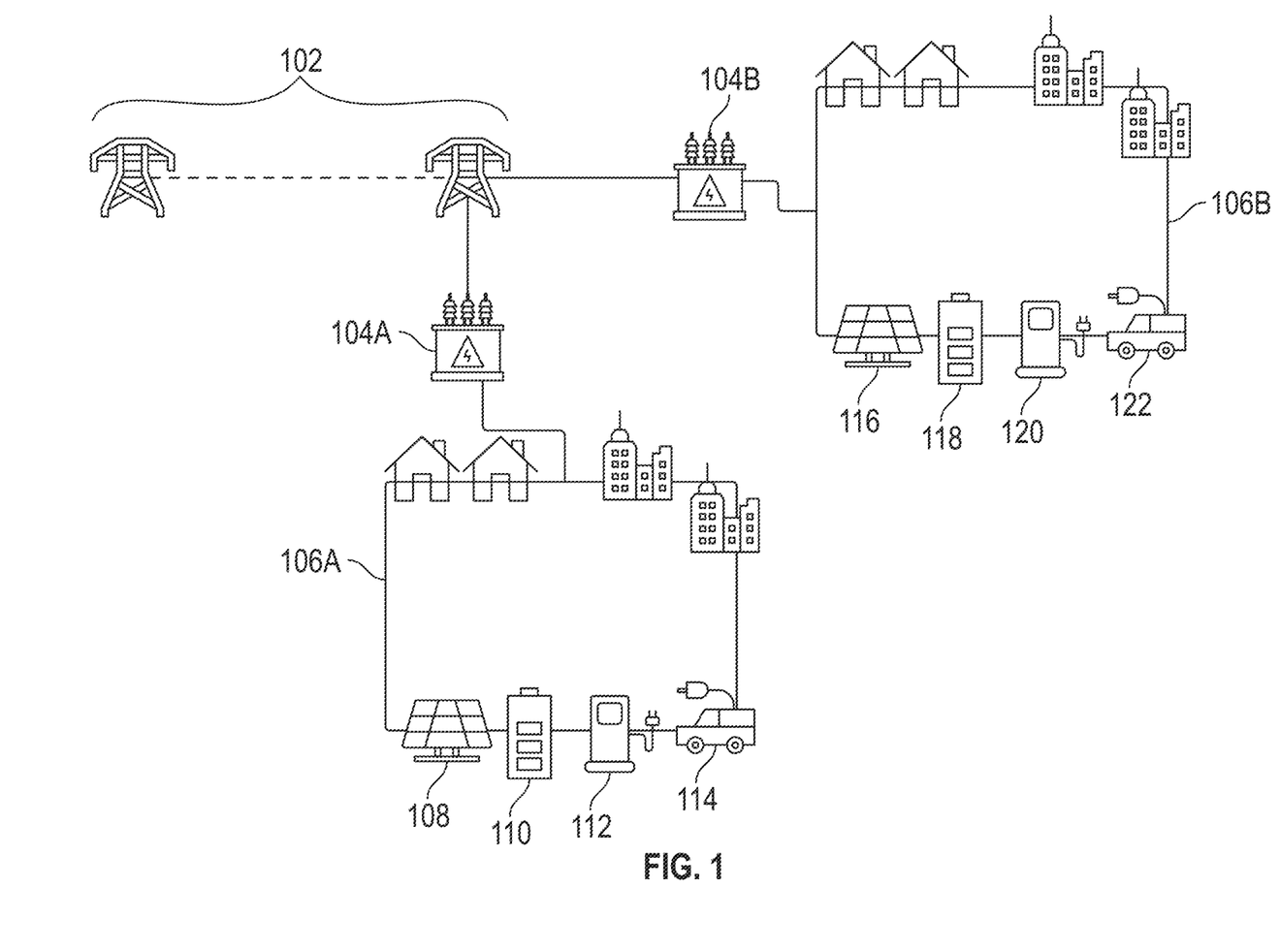
FIG. 1 illustrates an overview of an example system for energy distribution.

FIG. 1 illustrates an overview of an example system for energy distribution. In some embodiments, a transmission network 102 is configured to transmit energy from an electric grid to distribution substations 104A and 104B. In some embodiments, the distribution substations 104A and 104B are configured to distribution energy from the transmission network 102 to respective local distribution networks 106A and 106B (e.g., a distribution substation is an external interface of a respective local distribution network). In some embodiments, the local distribution network 106A comprises energy generation device 108 and energy storage device 110, and the local distribution network 106B comprises energy generation device 116 and energy storage device 118. Energy consuming devices 112 and 114 may receive energy provided by the local distribution network 106A (e.g., from distribution substation 104A, from energy generation device 108, from energy storage device 110), and energy consuming devices 120 and 122 may receive energy provided by the local distribution network 106B (e.g., from distribution substation 104A, from energy generation device 108, from energy storage device 110).

In some embodiments, the energy generation device 108 and the energy generation device 116 are configured to generate energy independently of their respective local distribution networks. For instance, the generated energy is different from the energy provided from a respective distribution substation (e.g., the provided energy from the energy generation device is different from energy from the grid).

In some embodiments, the energy generation device (e.g., the energy generation device 108, the energy generation device 116) comprises one or more alternative energy generation devices such as solar panels, wind turbine generator, water turbine generator, and fuel cells. In some embodiments, the energy generation device is configured to provide energy to an energy consuming device of its respective local distribution network (e.g., the energy generation device 108 is configured to provide energy to energy consuming device 112 and/or 114). In some embodiments, the energy generation device is configured to provide energy to an energy storage device for storage of the generated energy (e.g., the energy generation device 108 is configured to provide energy to the energy storage device 110 for storage).

In some embodiments, the energy generation devices are installed in a local distribution network to meet an energy demand of the local distribution network. For example, the distribution substation 104A is configured to provide a maximum power of 50 kW, and the energy demand of the local distribution network 106A is 100 kW (for example, due to increased population in the network). The energy generation devices may be installed and configured to meet the energy demand. For example, a combination of alternative energy devices and electric vehicles provide the 50 kW (or more, to reduce distribution substation output) power difference.

Figure 2:
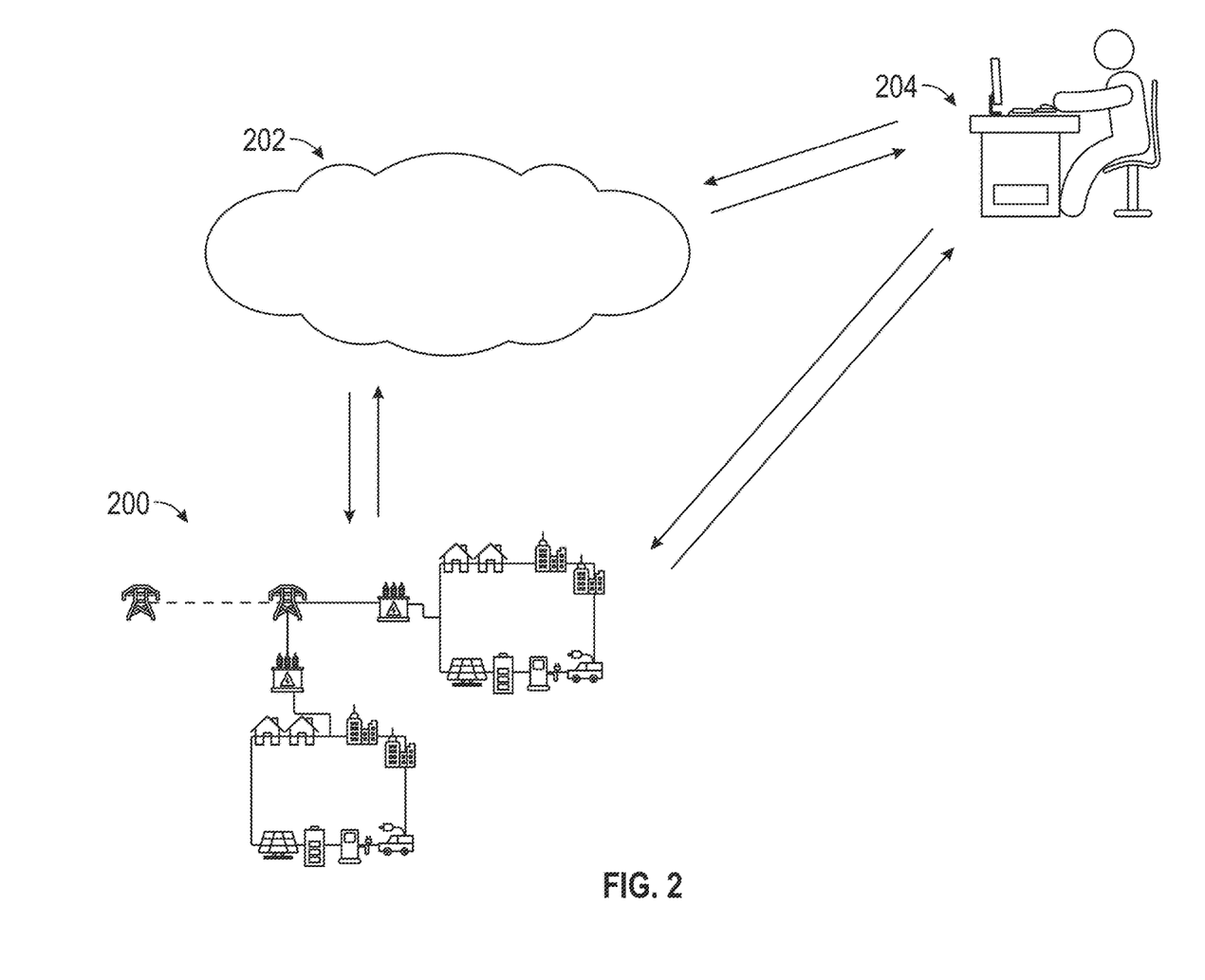
FIG. 2 illustrates an overview of an example system for energy distribution.

In some embodiments, the energy generation device is configured to communicate with a second electronic device (e.g., server 202, electronic device 204, an energy consuming device). In response to receiving an indication to provide energy (e.g., from the server 202, from the electronic device 204), the energy generation device is configured to provide energy in accordance with the indication (e.g., to an energy storage device, to an energy consuming device). In some embodiments, the determination to provide energy is determined by a processor of the energy generation device. The determination to provide energy (e.g., determined by the energy generation device, by the server 202, by the electronic device 204, by the energy consuming device) is described in more detail herein.

In some embodiments, the energy generation device is not associated with a particular neighborhood or a particular household. For example, the energy generation device is shared by an area of a local distribution network (e.g., the energy generation device is configured to provide energy to an energy consuming device of the area of the local distribution network). In some embodiments, the energy generation device is associated with a particular neighborhood or a particular household. For example, the energy generation device belongs to a particular community or a particular household. In some embodiments, by performing the methods disclosed herein, the energy generation device is configured to provide energy to the local distribution network that is different from energy provided via an external interface of the local distribution network (e.g., a distribution substation), satisfying the local distribution network's demand and relieving stress during times of high energy demand.

In some embodiments, the energy storage device 110 and the energy storage device 118 are configured to store electrical energy. For example, the energy storage device 110 is configured to store energy generated by energy generation device 108. The energy storage device may store energy from an external interface of the local distribution network (e.g., a distribution substation). In some embodiments, the energy storage device (e.g., the energy storage device 110, the energy storage device 118) is configured to provide the stored energy to an energy consuming device of its respective local distribution network. For example, the energy storage device 110 is configured to provide stored energy to energy consuming devices 112 and/or 114. The energy storage device advantageously stores unused energy generated by an energy generation device and/or provided from an external interface of the local distribution network (e.g., a distribution substation), allowing the stored energy to be provided at a time of high energy demand and relieving stress on an electric grid. In some embodiments, the energy storage device comprises a battery (e.g., a stationary battery, a battery of an electric vehicle) and/or a capacitor.

In some embodiments, the energy storage device is configured to communicate with a second electronic device (e.g., server 202, electronic device 204, an energy consuming device). In response to receiving an indication to provide energy (e.g., from the server 202, from the electronic device 204), the energy storage device is configured to provide energy in accordance with the indication (e.g., to an energy consuming device). In some embodiments, the determination to provide energy is determined by a processor of the energy storage device. The determination to provide energy (e.g., determined by the energy storage device, by the server 202, by the electronic device 204, by the energy consuming device) is described in more detail herein.

In some embodiments, the energy consuming device (e.g., energy consuming device 112, energy consuming device 120, energy consuming device 114, energy consuming device 122) is configured to receive energy (e.g., for powering, operating, and/or charging the energy consuming device). For example, the energy consuming device is an electric vehicle. As another example, the energy consuming device is a power dispenser for charging an electric vehicle. As yet another example, the energy consuming device is a public utility system or device. As yet another example, the energy consuming device is a consumer electronics system or device. In some embodiments, the energy consuming device is configured to be electrically coupled to a local distribution network (e.g., via an electrical outlet of the local distribution network). The received energy may be provided via an external interface of the local distribution network (e.g., a distribution substation from an electric grid), from an energy generation device, or an energy storage device.

As disclosed in more detail herein, during times of high demand (e.g., when an energy demand of a local distribution network exceeds the local distribution network's distribution limit), the energy consuming device may receive energy from a source different from an external interface of the local distribution (e.g., a distribution substation), relieving stress on a respective local distribution network while satisfying an energy demand of the energy consuming device.

In some embodiments, the energy consuming device is configured to provide energy to another energy consuming device. For example, a first energy consuming device comprises a battery for storing energy, and the first energy consuming device may share its stored energy with a second energy consuming device. The first energy consuming device may provide its unused energy to the second energy consuming device (e.g., during times of high local distribution network demand to satisfy the energy demand of the second energy consuming device and to relieve stress of a respective local distribution network). For instance, the energy consuming device is an electric vehicle comprising a battery, and energy stored in the battery may be provided to a second energy consuming device.

The second energy consuming device may have a high energy demand, and during times of high local distribution network demand, the second energy consuming device's demand may not be satisfied by energy provided by an external interface (e.g., a distribution substation) of the local distribution network. The first energy consuming device may advantageously provide its unused energy (e.g., the first energy consuming device has a lower demand (e.g., the first energy consuming device is not in use) than the second energy consuming device) to the second energy consuming device to satisfy the second device's energy demand. The energy transmitted from the first energy consuming device may be restored at a later time (e.g., recharged at a time when the local distribution network demand is lower). In some embodiments, a user associated with the first energy consuming device is incentivized (e.g., with energy credit, with money) to share the first device's energy.

In some embodiments, the energy consuming devices (e.g., energy consuming device 112, energy consuming device 114) are configured to adjust a rate of energy consumption (e.g., consumption of energy provided from an external interface of a local distribution network, consumption of energy different from energy provided from the external interface of the local distribution network). For example, the energy consuming device 114 is an electric vehicle, and the electric vehicle is configured to adjust a rate of receiving energy (e.g., from distribution substation 104A, from energy generation device 108, from energy storage device 110, from another energy consuming device). As an example, the electric vehicle requires 50 kWh of energy. The electric vehicle may adjust a rate of receiving energy to reach the required amount of energy. For example, the electric vehicle may be adjusted to receive the energy at 10 kW, such that the required amount of energy is reached in five hours, or the electric vehicle may be adjusted to receive the energy at 5 kW, such that the required amount of energy is reached in ten hours.

As another example, the energy consuming device 112 is a power dispenser, and the power dispenser is configured to adjust a rate of energy (e.g., from distribution substation 104A, from energy generation device 108, from energy storage device 110) provided to an electric vehicle. As an example, the power dispenser requires 50 kWh of energy for charging an electric vehicle. The power dispenser may adjust a rate of receiving energy to reach the required amount of energy. For example, the power dispenser may be adjusted to provide energy at 10 kW, such that the required amount of energy is reached in five hours, or the power dispenser may be adjusted to provide the energy at 5 kW, such that the required amount of energy is reached in ten hours.

In some embodiments, the energy consuming devices are configured to adjust the rate of energy consumption in accordance with a determination of an increased energy demand. For example, the local distribution substitution 104A is configured to provide a maximum power of 50 kW, and other devices (e.g., energy generation device 108, energy storage device 110, another energy consuming device) in the local distribution network 106A are configured to provide a maximum power of 50 kW. At a first time, one electric vehicle requiring 50 kWh of energy is charging at 10 kW, and based on the vehicle charging, the demand of the local distribution network is 10 kW. At a second time, ten electric vehicles, each requiring 50 kWh of energy, are charging at 10 kW, and based on the vehicles charging, the demand of the local distribution network is 100 kW.

In some embodiments, in accordance with a determination (e.g., by server 202, by electronic device 204) that the energy demand exceeds an energy demand threshold, the energy consuming device (e.g., the electric vehicles) is configured to reduce a rate of energy consumption. In some embodiments, the energy consuming device is configured to reduce the rate of energy consumption in response to receiving an indication to reduce the rate of energy (from e.g., server 202, electronic device 204 in accordance with the determination that the energy demand exceeds the energy demand threshold). In this example, in accordance with a determination that the energy demand exceeds an energy demand threshold (e.g., the 100 kW demand exceeds an e.g., 50 kW demand), the electric vehicles reduce the rate of consumption from 10 kW to 5 kW. Reducing the rate of consumption to 5 kW would reduce the demand of the local distribution network to 50 kW, reducing or smoothing out power demand peaks of the local distribution network (e.g., to the energy demand threshold).

By adjusting a rate of energy consumption, power demand peaks of a local distribution network may be reduced or smoothed out, relieving load on the electric grid or on other devices configured to provide energy, while allowing the energy consuming device's energy requirement to be satisfied. Although the above examples are described with respect to an electric vehicle and a power dispenser, it is appreciated that other energy consuming devices may be configured to adjust a rate of consuming energy to achieve the described benefits.

Although examples of energy distribution are described with respect to two local distribution networks and the described devices, it is appreciated that the disclosed systems for energy distribution may provide energy to different numbers of local distribution networks and different devices than described.

FIG. 2 illustrates an overview of an example system 200 for energy distribution. In some embodiments, the system 200 comprises energy generation devices described with respect to FIG. 1. In some embodiments, the system 200 further comprises other devices described with respect to FIG. 1. As described with respect to FIG. 1, in some embodiments, the energy generation devices (e.g., energy generation devices 108, 116), the energy storage device (e.g., energy storage devices 110, 118), and/or (e.g., energy consuming devices 112, 114, 120, 122) are configured to provide energy different from the energy provided via an external interface of the local distribution network (e.g., a distribution substation) (e.g., when an energy demand exceeds a distribution limit of a respective local distribution network). In some embodiments, the system 200 comprises a server 202 and/or an electronic device 204. As illustrated, the system is configured to communicate with server 202 and/or electronic device 204.

In some embodiments, the server 202 is a cloud server. The server 202 may be configured to perform the operations described herein. For example, the server 202 is configured to communicate with the energy generation devices (e.g., energy generation devices 108, 116), the energy storage device (e.g., energy storage devices 110, 118), and/or (e.g., energy consuming devices 112, 114, 120, 122) (e.g., to instruct the device to provide energy or store energy). In some embodiments, the server 202 is configured to determine how energy is provided by the devices of the system. In some embodiments, the server 202 is configured to provide an output from a machine learning algorithm for determining how energy is provided by the devices of the system.

In some embodiments, the electronic device 204 is a device of a user monitoring or operating the system. The electronic device 204 may communicate with the system 200 via server 202 and/or directly. For example, the user (e.g., an electric grid system operator) monitors one or more local distribution networks associated with the system 200, and the electronic device 204 is configured to operate the system 200 and provide input for operating the system 200. In some embodiments, the electronic device 204 is configured to provide a user interface for receiving the input for operating the system 200 (e.g., a selection of a device to provide energy to an energy consuming device). In some embodiments, the user interface is configured to display information about the system 200 and its associated local distribution networks (e.g., a demand of a local distribution network, energy output of energy generation devices, status of devices associated with the local distribution network). Information for providing the user interface may be provided from server 202 and/or another device of the system 200 (e.g., an energy generation device, an energy storage device, an energy consuming device). In some embodiments, the system (e.g., server 202, electronic device 204, an energy generation device, an energy storage device, an energy consuming device) is configured to monitor the energy demand of the local distribution network, and energy may be provided to an energy consuming device based on the demand monitoring.

In some embodiments, the system 200 (e.g., the server 202, electronic device 204, a device (e.g., described with respect to FIG. 1) associated with the local distribution) is configured to determine an energy demand of a local distribution network. For example, the server 202 determines an energy demand of local distribution network 106A. In some embodiments, the system 200 (e.g., the server 202, electronic device 204, a device (e.g., described with respect to FIG. 1) associated with the local distribution) is configured to determine whether the energy demand exceeds a distribution limit of the local distribution network. An energy demand exceeding a distribution limit of a local distribution network may be an indication of high energy demand and/or stress on an electric grid. For example, an energy demand of the local distribution network 106A at a certain time exceeds the distribution limit of the local distribution network 106A.

In some embodiments, the distribution limit is a maximum amount of energy that may be provided to a respective local distribution network via an electric grid. In some embodiments, the distribution limit is a percentage (e.g., 80%, 90%) of the maximum amount of energy that may be provided to a respective local distribution network via an electric grid (e.g., an indication to provide energy via an alternative energy source is transmitted before the electric grid is exhausted by a maximum demand). In some embodiments, the distribution limit is determined based on parameters and/or conditions of the respective local distribution network (e.g., operating conditions of utility equipment, estimated probability of an energy spike, current events associated with the local distribution network).

In some embodiments, determining the energy demand comprises estimating the energy demand of the local distribution network (e.g., by the system 200). For example, the energy demand is estimated based on time, weather, geography, demand pattern, forecasts, historical data, or any combination thereof. In some embodiments, the server 202 is configured to provide an output of a machine learning algorithm for estimating the energy demand. In some embodiments, the server 202 is configured to receive input (e.g., historical data, data from other local distribution networks, energy demand models) for training the machine learning algorithm.

In some embodiments, the first energy demand of the local distribution network is determined at a first time, and the system 200 is configured to determine a second energy demand of the local distribution network based on the first energy demand at a second time different from the first time. For example, the server 202 determines a second energy demand at a second time different from the first time based on the first energy demand (e.g., estimate a future energy demand based on the received first energy demand).

In some embodiments, the system 200 (e.g., the server 202, electronic device 204, a device (e.g., described with respect to FIG. 1) associated with the local distribution) is configured to determine a consumption priority of an energy consuming device (e.g., an energy consuming device described with respect to FIG. 1) in accordance with a determination that the energy demand of the local distribution network exceeds its distribution limit. For example, a consumption priority of the energy consuming device 114 associated with local distribution network 106A is determined.

In some embodiments, in accordance with a determination that the consumption priority is greater than a priority threshold, the system 200 (e.g., the server 202, electronic device 204, a device (e.g., described with respect to FIG. 1) associated with the local distribution) is configured to transmit an indication to provide energy to the energy consuming device. For example, the server 202 determines that the consumption priority of the energy consuming device 114 is greater than a priority threshold, then the server 202 transmits an indication to provide energy (e.g., an instruction to energy generation device 108, energy storage device 110, or another energy consuming device to provide energy) to the energy consuming device 114 (e.g., for charging an electric vehicle electrically coupled to the local distribution network via an electrical outlet, for charging an electric vehicle via a power dispenser electrically coupled to the local distribution network).

In some embodiments, the consumption priority represents an energy receiving priority of an energy consuming device. For example, an energy consuming device having a higher demand (e.g., public utility equipment, healthcare systems, safety critical systems, an electric vehicle, air conditioning unit) may have a higher consumption priority. In some embodiments, the consumption priority of an energy consuming device may be updated (e.g., based on an updated demand (e.g., a user wishes an electric vehicle to be charged earlier, local temperature rise increases demand of air conditioning) of the energy consuming device).

In some embodiments, the consumption priority of an electronic device reflects the electronic device's need for energy. In some embodiments, the consumption priority is based on a state of the corresponding energy consuming device. The consumption priority may be based on, for example, the electronic device's battery's state of charge (e.g., a lower state of charge corresponds to a higher consumption priority) or an importance (e.g., an urgency) associated with using the electronic device (e.g., a higher importance corresponds to a higher consumption priority). In some embodiments, the consumption priority is based on a time when the energy consuming device requests energy. For example, the consumption priority of an electric vehicle to be charged is higher during the day because there may be a higher chance that the electric vehicle is used. The consumption priority may be represented by ranking, and an electronic device having a higher consumption priority ranking has a higher need for energy, compared to an electronic device having a lower ranking. As another example, the consumption priority may be represented by a score (e.g., out of 100), and an electronic device having a higher consumption priority score has a higher need for energy, compared to an electronic device having a lower score.

In some embodiments, the priority threshold represents an ability of non-grid energy sources (e.g., energy generation devices, energy storage devices, energy consuming devices configured to provide energy, different from energy provided via an external interface of a local distribution network) to provide energy. For example, the priority threshold would be lower for a local distribution network comprising non-grid energy sources having a higher ability to provide energy (e.g., a lower threshold would mean that more non-grid energy may be provided (e.g., during times of stress)). As another example, the priority threshold would be higher for a local distribution network comprising non-grid energy sources having a lower ability to provide energy (e.g., a higher threshold would mean that less non-grid energy may be provided (e.g., during times of stress)). In some embodiments, the priority threshold may be updated based on an updated ability of the non-grid energy sources (e.g., additional non-grid energy sources are added or removed, updated efficiency of non-grid energy sources) to provide energy. The priority threshold may be a threshold rank, and an electronic device having consumption priority ranking higher than the threshold rank may receive the non-grid energy. The priority threshold may be a threshold score (e.g., 50 out of 100), and an electronic device having consumption priority score higher than the threshold score (e.g., higher than 50) may receive the non-grid energy.

In some embodiments, the energy is different from energy provided via an external interface (e.g., distribution substation, from an electric grid) of the local distribution network. For example, the provided energy is generated by an alternative energy generator, as described with respect to FIG. 1. As another example, the provided energy is energy stored (e.g., in energy storage devices, in energy consuming devices configured to provide energy) from an earlier time.

In some embodiments, in accordance with a determination that the consumption priority is not greater than the priority threshold, the system 200 is configured to forgo transmitting the indication to provide energy to the energy consuming device. For example, the server 202 determines that the consumption priority of the energy consuming device 114 is not greater than a priority threshold, then the server 202 forgoes transmitting the indication to provide energy to the energy consuming device 114.

In some embodiments, the energy consuming device is an electric vehicle, and the provided energy is for charging the electric vehicle. As electric vehicle (EV) adoption increases, stress on an electric gird may in turn increase due to increased demand for electricity. Expensive upgrades may need to be performed (e.g., electric utility company installing additional hardware to the grid) to accommodate the increased demand. Furthermore, the costly upgrades may not permanently satisfy the increased demand because locations of the demand may depend on EV charging locations, and the costly upgrades may no longer be useful over time. The disclosed systems allow this increasing demand to be met while accounting for the different EV charging locations, and the expensive upgrades may be forgone.

In some embodiments, the system 200 is configured to transmit an indication to provide energy to the energy consuming device via the external interface of the local distribution network in accordance with a determination that the energy demand does not exceed the distribution limit. For example, the server 202 determines that the energy demand does not exceed the distribution limit (e.g., the electric grid is determined to not be under stress). The server 202 transmits an indication to an indication to provide energy to the energy consuming device 114 via distribution substation 104A (e.g., the server 202 transmits an indication to the distribution substation 104A to provide energy to the energy consuming device 114 from the electric grid).

In some embodiments, the consumption priority of the energy consuming device is updated (e.g., as described above). In some embodiments, the system 200 is configured to transmit the indication to provide energy to the energy consuming device in accordance with a determination that the updated consumption priority is greater than the priority threshold. For example, at a first time, the energy consuming device 114's consumption priority may be lower than the priority threshold. At a second time, the energy consuming device 114's consumption priority is updated (e.g., as described above), and the server 202 determines that the updated consumption priority is higher than the priority threshold of the local distribution network, and transmits an indication to provide energy to the energy consuming device 114. In some embodiments, the priority threshold is updated (e.g., as described above). In some embodiments, the system 200 is configured to transmit the indication to provide energy to the energy consuming device in accordance with a determination that the consumption priority is greater than the updated priority threshold (e.g., the updated priority threshold becomes lower than the consumption priority).

In some embodiments, the system 200 is configured to transmit an indication to postpone providing energy to the energy consuming device in accordance with the determination that the consumption priority is not greater than the priority threshold. For example, the server 202 determines that the consumption priority of energy consuming device 114 is not greater than the priority threshold of local distribution network 106A. The server is transmits an indication to postpone (e.g., when demand of the local distribution network 106A lowers) providing energy to the energy consuming device 114 (e.g., for charging of an electric vehicle).

In some embodiments, the system 200 is configured to determine a second energy demand of the local distribution network. The system 200 is configured to transmit an indication to provide energy to the energy consuming device via the external interface of the local distribution network in accordance with a determination that the second energy demand does not exceed the distribution limit of the local distribution network. For example, the server 202 is configured to determine a second energy demand of the local distribution network 106A (e.g., at a second time after the first energy demand exceeds the distribution limit of the local distribution network), and in accordance with a determination that the second energy demand does not exceed the distribution limit of the local distribution network (e.g., the grid is no longer stressed at the second time), the server 200 transmits an indication to provide energy to the energy consuming device 114 (e.g., for charging an electric vehicle) via the distribution substation 104A.

In some embodiments, the system 200 is configured to determine a second consumption priority of a second energy consuming device electrically coupled to the local distribution network. The system 200 is configured to transmit a second indication to provide energy to the second energy consuming device in accordance with a determination that the second consumption priority is greater than the priority threshold. For example, the server 202 determines that the consumption priority of the energy consuming device 112 is greater than the priority threshold, then the server 202 transmits the indication to provide energy to the energy consuming device 112. In some embodiments, the provided energy is different from energy provided via the external interface of the local distribution network. For example the energy provided to the energy consuming device 112 is different from energy provided via distribution substation 104A (e.g., from a non-grid energy source described herein).

In some embodiments, the first consumption priority is higher than the second consumption priority, and in accordance with a determination that the first consumption priority is higher than the second consumption priority, the system 200 is configured to transmit an indication to provide energy to the first energy consuming device before providing energy to the second energy consuming device. For example, the server 202 determines that the consumption priority of energy consuming device 114 is higher than the consumption priority of energy consuming device 112. The server 202 may transmit an indication to provide energy to the energy consuming device 114 before providing energy consuming device 112 (e.g., the energy consuming devices are electric vehicles, and the indication limits a number of electric vehicles to charge at a same time from the non-grid energy sources).

In some embodiments, the system 200 is configured to forgo transmitting the second indication to provide energy to the second energy consuming device in accordance with a determination that the second consumption priority is not greater than the priority threshold. For example, the server 202 determines that the consumption priority of the energy consuming device 112 is not greater than a priority threshold, then the server 202 forgoes transmitting the indication to provide energy to the energy consuming device 112.

In some embodiments, the system 200 is configured to determine a change in energy demand of the local distribution network and determine whether the change in energy demand exceeds an energy spike limit of the local distribution network. For example, the server 202 is configured to determine whether a change of energy demand of the local distribution network 106A exceeds an energy spike limit (e.g., determine whether the rate of change of demand may be quantify as an energy spike). In some embodiments, the energy spike limit is a threshold rate of change, such that a change in energy demand exceeding the threshold rate of change would quantify as an energy spike.

In some embodiments, the system 200 is configured to determine the consumption priority of the energy consuming device in accordance with a determination that the energy demand change exceeds the energy spike limit. The system 200 is configured to transmit the indication to provide the energy to the energy consuming device in accordance with the determination that the consumption priority is greater than the priority threshold. For example, the server 202 determines that an energy spike is occurring at the local distribution network (based on the determination that the change in energy demand exceeds the energy spike limit). The server 202 transmits an indication to provide energy (e.g., via a non-grid energy source to reduce stress from the energy spike) to the energy consuming device 114 in accordance with the determination that the consumption priority of the energy consuming device 114 is greater than the priority threshold.

The system 200 is configured to forgo transmitting the indication to provide energy to the energy consuming device in accordance with the determination that the consumption priority is not greater than the priority threshold. For example, the server 202 forgoes transmits the indication to provide energy to the energy consuming device 114 in accordance with the determination that the consumption priority of the energy consuming device 114 is not greater than the priority threshold (e.g., energy from the non-grid source is provided an energy consuming device with a higher consumption priority).

Although examples of energy distribution are described with respect to two local distribution networks and the described devices, it is appreciated that the disclosed systems for energy distribution may provide energy to different numbers of local distribution networks and different devices than described, and that determination of how the energy is provided may be performed by different numbers or combination of devices than described.

Figure 3:
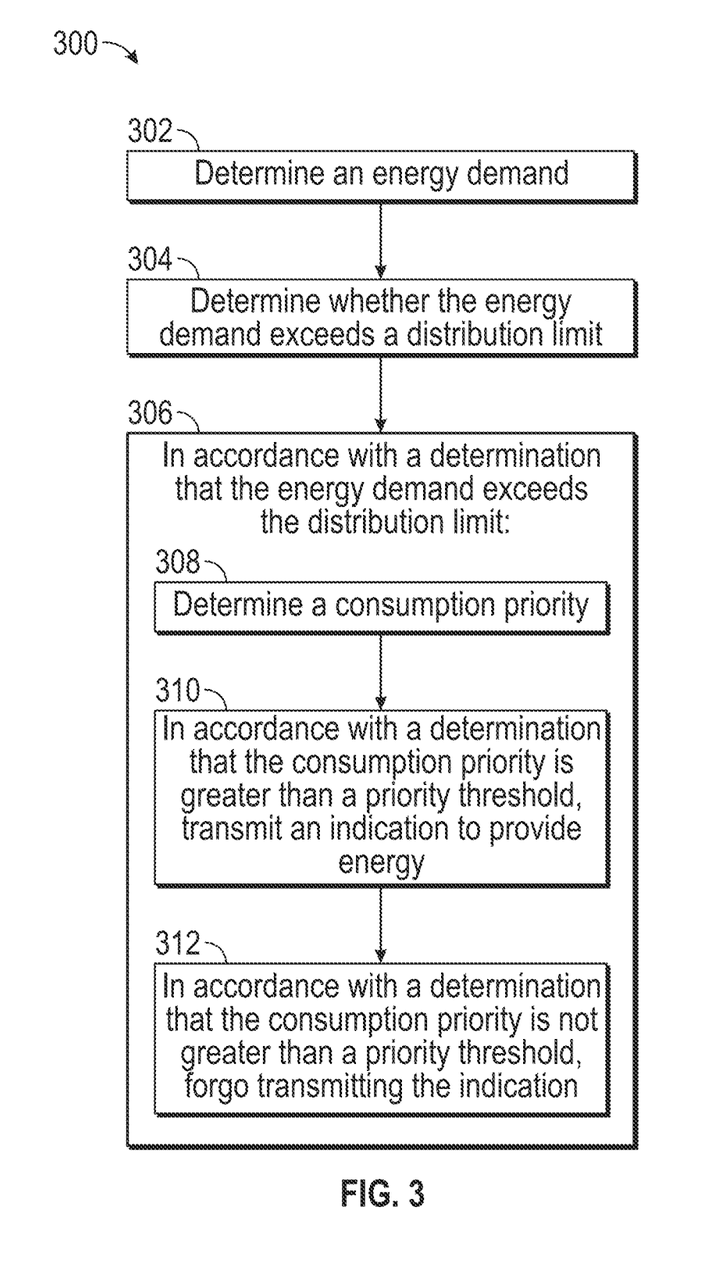
FIG. 3 illustrates an example method for energy distribution.

FIG. 3 illustrates an example method 300 for energy distribution. The method 300 may be performed with the systems described with respect to FIGS. 1-2. It is appreciated that the steps of method 300 leverage the features and advantages described with respect to FIGS. 1-2.

In some embodiments, the method 300 comprises determining an energy demand of the local distribution network (step 302). For example, as described with respect to FIGS. 1-2, the server 202 determines an energy demand of the local distribution network 106A. In some embodiments, the method 300 comprises determining whether the energy demand exceeds a distribution limit of the local distribution network (step 304). For example, as described with respect to FIGS. 1-2, the server 202 determines whether the energy demand exceeds a distribution limit of the local distribution network 106A.

In some embodiments, determining the energy demand comprises estimating the energy demand of the local distribution network. For example, as described with respect to FIGS. 1-2, the server 202 is configured to estimate the energy demand of the local distribution network. The energy demand may be estimated based on time, weather, geography, demand pattern, forecasts, historical data, or any combination thereof.

In some embodiments, the method 300 comprises monitoring the energy demand of the local distribution network. For example, as described with respect to FIGS. 1-2, a device of system 200 (e.g., server 202, electronic device 204, an energy generation device, an energy storage device, an energy consumption device) is configured to monitor the energy demand of the local distribution network.

In some embodiments, in accordance with a determination that the energy demand exceeds the distribution limit (step 306): the method 300 comprises determining a consumption priority of an energy consuming device (step 308). For example, as described with respect to FIGS. 1-2, the server 202 determines a consumption priority of energy consuming device 114 (e.g., an electric vehicle). In some embodiments, the consumption priority is determined based on a state of the energy consumption device. For example, as described with respect to FIGS. 1-2, the energy consumption device is an electric vehicle, and the consumption priority is determined based on the state of the electric vehicle.

In some embodiments, the method 300 comprises in accordance with a determination that the consumption priority is greater than a priority threshold, transmitting an indication to provide energy to the energy consuming device (step 310). For example, as described with respect to FIGS. 1-2, the server 202 transmits an indication to provide energy to energy consuming device 114 (e.g., for charging an electric vehicle, for providing energy to a power dispenser for charging the electric vehicle) in accordance with a determination that the consumption priority of the energy consuming device 114 is greater than the priority threshold. In some embodiments, the provided energy is different from energy provided from an external interface of the local distribution network. For example, as described with respect to FIGS. 1-2, the energy provided to the energy consuming device 114 (in accordance with the above determination) is different from energy provided via the distribution substation 104A, allowing the energy demand of the local distribution network 106A to be satisfied and relieving the network's stress. In some embodiments, the energy is provided by a non-grid energy source (e.g., an energy generation device, an energy storage device, an energy consumption device configured to provide energy), as described with respect to FIGS. 1-2.

In some embodiments, the method 300 comprises updating the priority threshold, and in accordance with a determination that the consumption priority is greater than the updated priority threshold, transmitting the indication to provide energy to the energy consuming device. For example, as described with respect to FIGS. 1-2, the priority threshold is updated, and the server 202 transmits an indication to provide energy to the energy consuming device 114 in accordance with a determination that the consumption priority of the energy consuming device 114 is greater than the updated priority threshold.

In some embodiments, the method 300 comprises in accordance with a determination that the consumption priority is not greater than the priority threshold, forgoing transmitting the indication to provide energy to the energy consuming device (step 310). For example, as described with respect to FIGS. 1-2, the server 202 forgoes transmitting the indication to provide energy to the energy consuming device 114 in accordance with a determination that the consumption priority is not greater than the priority threshold.

In some embodiments, the method 300 comprises in accordance with a determination that the energy demand does not exceed the distribution limit, transmitting an indication to provide energy to the energy consuming device via the external interface of the local distribution network. For example, as described with respect to FIGS. 1-2, the server 202 transmits an indication to provide energy to energy consuming device 114 via distribution substation 104A (e.g., from the electric grid) in accordance with a determination that the energy demand does not exceed the distribution limit (e.g., the local distribution network 106A is determined to not be under stress).

In some embodiments, the method 300 comprises updating the consumption priority of the energy consuming device, and in accordance with a determination that the updated consumption priority is greater than the priority threshold, transmitting the indication to provide energy to charge the electric vehicle. For example, as described with respect to FIGS. 1-2, the consumption priority of the energy consuming device 114 updated, and the server 202 transmits an indication to provide energy to the energy consuming device 114 in accordance with a determination that the updated consumption priority is greater than the priority threshold of the local distribution network 106A.

In some embodiments, the method 300 comprises in accordance with the determination that the consumption priority is not greater than the priority threshold, transmitting an indication to postpone providing energy to the energy consuming device. For example, as described with respect to FIGS. 1-2, the server 202 transmits an indication to postpone providing energy to the energy consuming device 114 in accordance with a determination that the consumption priority of the energy consuming device 114 is not greater than the priority threshold of the local distribution network 106A.

In some embodiments, the method 300 comprises determining a second energy demand of the local distribution network, and in accordance with a determination that the second energy demand does not exceed the distribution limit, transmitting an indication to provide energy to the energy consuming device via the external interface of the local distribution network. For example, as describe with respect to FIGS. 1-2, the server 202 determines a second energy demand of the local distribution network 106A, and the server 202 transmits an indication to provide energy to the energy consuming device 114 via the distribution substation 104A (e.g., from the electric grid) in accordance with a determination that the second energy demand does not exceed the distribution limit (e.g., the energy demand of the local distribution network has lowered).

In some embodiments, the method 300 comprises determining a second consumption priority of a second energy consuming device, in accordance with a determination that the second consumption priority is greater than the priority threshold, transmitting a second indication to provide energy to the second energy consuming device, and in accordance with a determination that the second consumption priority is not greater than the priority threshold, forgoing transmitting the indication to provide energy to the electronic device. For example, as described with respect to FIGS. 1-2, the server 202 determines a consumption priority of energy consuming device 112, and in accordance with a determination that the consumption priority of energy consuming device 112 is greater than the priority threshold of the local distribution network 106A, the server 202 transmits an indication to provide energy to the energy consuming device 112. In accordance with a determination that the consumption priority of the energy consuming device 112 is not greater than the priority threshold of the local distribution network 106A, the server 202 forgoes transmitting the indication to provide energy to the energy consuming device 112. In some embodiments, the provided energy is different from energy provided via the external interface of the local distribution network (e.g., the energy to the second energy consuming device is provided from a non-grid source as described with respect to FIGS. 1-2).

In some embodiments, the first consumption priority is higher than the second consumption priority, and the method 300 comprises in accordance with a determination that the first consumption priority is higher than the second consumption priority, transmitting an indication to provide energy to the first energy consuming device before providing energy to the second energy consuming device. For example, as described to FIGS. 1-2, the server 202 determines that the consumption priority of energy consuming device 114 is higher than the consumption priority of energy consuming device 112. The server 202 may transmit an indication to provide energy to the energy consuming device 114 before providing energy consuming device 112 (e.g., the energy consuming devices are electric vehicles, and the indication limits a number of electric vehicles to charge at a same time from the non-grid energy sources).

In some embodiments, the first energy demand of the local distribution network is determined at a first time, and the method 300 comprises determining a second energy demand of the local distribution network at a second time different from the first time based on the first energy demand. For example, as described with respect to FIGS. 1-2, the server 202 determines a second energy demand of the local distribution network based on a first energy demand determined at an earlier time.

In some embodiments, the method 300 comprises determining a change in energy demand of the local distribution network, and determining whether the energy demand change exceeds an energy spike limit of the local distribution network. For example, as described with respect to FIGS. 1-2, the server 202 determines whether there is an energy spike at the local distribution network based on a determination of a change in energy demand of local distribution network.

In some embodiments, the method 300 comprises in accordance with a determination that the energy demand change exceeds the energy spike limit, determining the consumption priority of the energy consuming device. For example, as described with respect to FIGS. 1-2, the server 202 determines the occurrence of an energy spike at the local distribution network, and the server 202 determines the consumption priority of the energy consuming device (e.g., to determine whether to provide energy from a non-grid energy source to the energy consuming device).

In some embodiments, the method 300 comprises in accordance with the determination that the consumption priority is greater than the priority threshold, transmitting the indication to provide the energy to the energy consuming device. For example, as described with respect to FIGS. 1-2, the server 202 transmits the indication to provide energy to the energy consuming device in accordance with the determination that the consumption priority of the energy consuming device is greater than the priority threshold of the local distribution network.

In some embodiments, the method 300 comprises in accordance with the determination that the consumption priority is not greater than the priority threshold, forgoing transmitting the indication to provide energy to the electric vehicle. For example, as described with respect to FIGS. 1-2, the server 202 forgoes transmitting the indication to provide energy to the energy consuming device in accordance with the determination that the consumption priority of the energy consuming device is not greater than the priority threshold of the local distribution network.

In some embodiments, the method 300 comprises providing information for presenting a user interface associated with the local distribution network. For example, a device of system 200 (e.g., server 202, an energy generation device, an energy storage device, an energy consuming device) is configured to provide information for presenting a user interface associated with a local distribution network on electronic device 204.

In some embodiments, the method 300 comprises determining whether the energy demand exceeds an energy demand threshold. In some embodiments, the method 300 comprises, in accordance with a determination that the energy demand exceeds an energy demand threshold, transmitting an indication to reduce a rate of energy consumption of the energy consuming device. For example, as described with respect to FIGS. 1-2, an electric vehicle or a power dispenser is configured to reduce a rate of energy consumption in accordance with a determination that the energy demand of the local distribution network exceeds an energy demand threshold. In some embodiments, the electric vehicle or the power dispenser reduces the rate of energy consumption in response to receiving the indication to reduce the rate of energy consumption. For example, the server 202, electronic device 204, an energy generation device, an energy storage device, an energy consuming device, or a grid device that determined that the energy demand exceeds the energy demand threshold is configured to transmit this indication. In some embodiments, the method 300 comprises, in accordance with a determination that the determination that the energy demand does not exceed the energy demand threshold, forgoing transmitting the indication to reduce the rate of energy consumption of the energy consuming device.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for energy distribution including the particular steps of the method of FIG. 3, this disclosure contemplates any suitable method for energy distribution including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
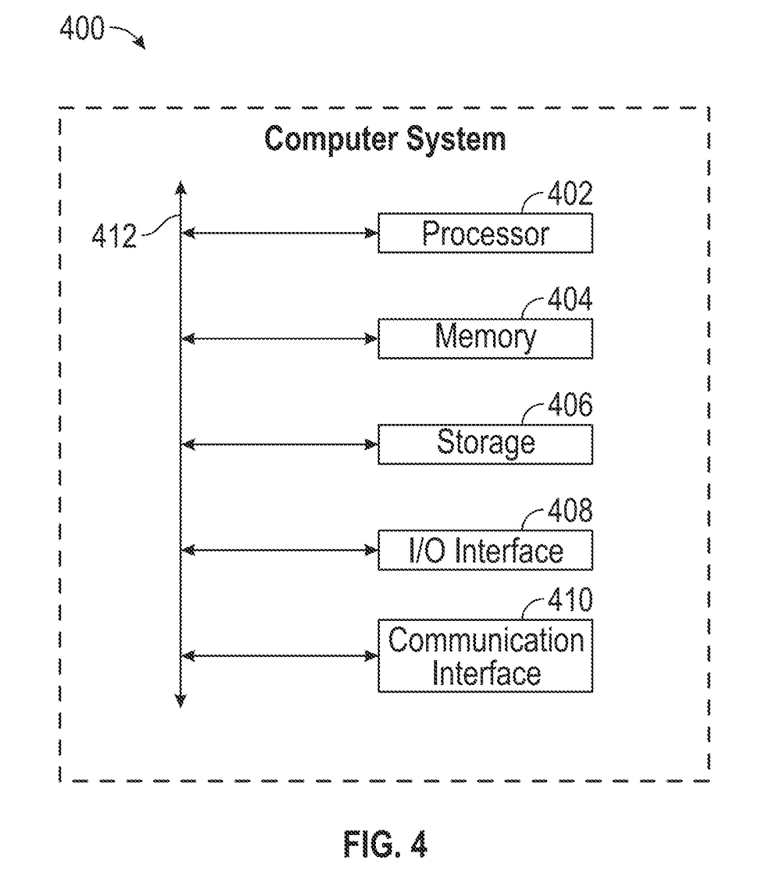
FIG. 4 illustrates an example computer system.

FIG. 4 illustrates an example computer system 400. In particular embodiments, one or more computer systems 400 perform one or more steps of one or more methods described or illustrated herein (e.g., determination of whether to transmit an indication to provide energy to an energy consuming device). In particular embodiments, one or more computer systems 400 provide functionality described or illustrated herein. In particular embodiments, software running on one or more computer systems 400 performs one or more steps of one or more methods described or illustrated herein or provides functionality described or illustrated herein (e.g., software causing system 200 to perform the disclosed methods and operations). Particular embodiments include one or more portions of one or more computer systems 400. Herein, reference to a computer system may encompass a computing device, and vice versa, where appropriate. Moreover, reference to a computer system may encompass one or more computer systems, where appropriate. In some embodiments, devices of system 200 (e.g., server 202, electronic device 204, an energy generation device, an energy storage device, an energy consuming device) comprises one or more computer system 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes instructions in one or more internal registers or internal caches or in memory 404 (as opposed to storage 406 or elsewhere) and operates on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packetbased communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

In some embodiments, a method for charging an electric vehicle electrically coupled to a local distribution network comprises: determining an energy demand of the local distribution network; determining whether the energy demand exceeds a distribution limit of the local distribution network; and in accordance with a determination that the energy demand exceeds the distribution limit: determining a consumption priority of the electric vehicle; in accordance with a determination that the consumption priority is greater than a priority threshold, transmitting an indication to provide energy to charge the electric vehicle, wherein the provided energy is different from energy provided from an external interface of the local distribution network; and in accordance with a determination that the consumption priority is not greater than the priority threshold, forgoing transmitting the indication to provide energy to the electric vehicle.

In some embodiments, the method further comprises: determining whether the energy demand exceeds an energy demand threshold; in accordance with a determination that the energy demand exceeds an energy demand threshold, transmitting an indication to reduce a rate of consumption of the electric vehicle; and in accordance with a determination that the energy demand does not exceed the energy demand threshold, forgoing transmitting the indication to reduce the rate of consumption of the electric vehicle.

In some embodiments, the method further comprises in accordance with a determination that the energy demand does not exceed the distribution limit, transmitting an indication to charge the electric vehicle via the external interface of the local distribution network.

In some embodiments, the method further comprises: updating the consumption priority of the electric vehicle; and in accordance with a determination that the updated consumption priority is greater than the priority threshold, transmitting the indication to provide energy to charge the electric vehicle.

In some embodiments, the method further comprises in accordance with the determination that the consumption priority is not greater than the priority threshold, transmitting an indication to postpone charging of the electric vehicle.

In some embodiments, the method further comprises: determining a second energy demand of the local distribution network; in accordance with a determination that the second energy demand does not exceed the distribution limit, transmitting an indication to charge the electric vehicle via the external interface of the local distribution network.

In some embodiments, the provided energy is generated via solar panels.

In some embodiments, determining the energy demand comprises estimating the energy demand of the local distribution network.

In some embodiments, the energy demand is estimated based on time, weather, geography, demand pattern, forecasts, historical data, or any combination therefor.

In some embodiments, the energy is provided from a second electric vehicle.

In some embodiments, the consumption priority is determined based on a state of the electric vehicle.

In some embodiments, the method further comprises updating the priority threshold; and in accordance with a determination that the consumption priority is greater than the updated priority threshold, transmitting the indication to provide energy to charge the electric vehicle.

In some embodiments, the energy is provided from an energy storage device.

In some embodiments, the method further comprises: determining a second consumption priority of an electronic device different from the electric vehicle; in accordance with a determination that the second consumption priority is greater than the priority threshold, transmitting a second indication to provide energy to the electronic device, wherein the provided energy is different from energy provided via the external interface of the local distribution network; and in accordance with a determination that the second consumption priority is not greater than the priority threshold, forgoing transmitting the indication to provide energy to the electronic device.

In some embodiments, the first consumption priority is higher than the second consumption priority, the method further comprising in accordance with a determination that the first consumption priority is higher than the second consumption priority, transmitting an indication to provide energy to the electric vehicle before providing energy to the electronic device.

In some embodiments, the first energy demand of the local distribution network is determined at a first time, and the method further comprises determining a second energy demand of the local distribution network at a second time different from the first time based on the first energy demand.

In some embodiments, the method further comprises: determining a change in energy demand of the local distribution network; and determining whether the energy demand change exceeds an energy spike limit of the local distribution network; and in accordance with a determination that the energy demand change exceeds the energy spike limit: determining the consumption priority of the electric vehicle; in accordance with the determination that the consumption priority is greater than the priority threshold, transmitting the indication to provide the energy to charge the electric vehicle; and in accordance with the determination that the consumption priority is not greater than the priority threshold, forgoing transmitting the indication to provide energy to the electric vehicle.

In some embodiments, the energy is provided to a power dispenser for charging the electric vehicle.

In some embodiments, a system for charging an electric vehicle comprises: an energy generation device electrically coupled to a local distribution network, and an electronic device, wherein the electronic device is configured to perform a method comprising: determining an energy demand of the local distribution network; determining whether the energy demand exceeds a distribution limit of the local distribution network; and in accordance with a determination that the energy demand exceeds the distribution limit: determining a consumption priority of the electric vehicle; in accordance with a determination that the consumption priority is greater than a priority threshold, transmitting an indication to provide energy to charge the electric vehicle, wherein the provided energy is different from energy provided via an external interface the local distribution network; and in accordance with a determination that the consumption priority is not greater than the priority threshold, forgoing transmitting the indication to provide energy to the electric vehicle.

In some embodiments, a non-transitory computer readable storage medium storing one or more programs, the one or more programs comprising instructions, which when executed by a system with one or more processors and memory, cause the system to perform a method comprising: determining an energy demand of a local distribution network; determining whether the energy demand exceeds a distribution limit of the local distribution network; and in accordance with a determination that the energy demand exceeds the distribution limit: determining a consumption priority of an electric vehicle; in accordance with a determination that the consumption priority is greater than a priority threshold, transmitting an indication to provide energy to charge the electric vehicle, wherein the provided energy is different from energy provided via an external interface of the local distribution network; and in accordance with a determination that the consumption priority is not greater than the priority threshold, forgoing transmitting the indication to provide energy to the electric vehicle.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for charging an electric vehicle electrically coupled to a local distribution network, comprising:
    determining an energy demand of the local distribution network;
    determining whether the energy demand exceeds a distribution limit of the local distribution network;
    determining a change in energy demand of the local distribution network;
    determining whether the change in energy demand exceeds an energy spike limit of the local distribution network; and
    in accordance with a determination that the energy demand exceeds the distribution limit and a determination that the change in energy demand exceeds the energy spike limit:
        determining a consumption priority of the electric vehicle;
        in accordance with a determination that the consumption priority is greater than a priority threshold, transmitting an indication to provide energy to charge the electric vehicle, wherein the provided energy is different from energy provided from an external interface of the local distribution network; and in accordance with a determination that the consumption priority is not greater than the priority threshold, forgoing transmitting the indication to provide energy to the electric vehicle.

2. The method of claim 1, further comprising:
determining whether the energy demand exceeds an energy demand threshold;
in accordance with a determination that the energy demand exceeds the energy demand threshold, transmitting an indication to reduce a rate of consumption of the electric vehicle; and
in accordance with a determination that the energy demand does not exceed the energy demand threshold, forgoing transmitting the indication to reduce the rate of consumption of the electric vehicle.

3. The method of claim 1, further comprising in accordance with a determination that the energy demand does not exceed the distribution limit, transmitting an indication to charge the electric vehicle via the external interface of the local distribution network.

4. The method of claim 1, further comprising:
updating the consumption priority of the electric vehicle; and
in accordance with a determination that the updated consumption priority is greater than the priority threshold, transmitting the indication to provide energy to charge the electric vehicle.

5. The method of claim 1, further comprising in accordance with the determination that the consumption priority is not greater than the priority threshold, transmitting an indication to postpone charging of the electric vehicle.

6. The method of claim 1, further comprising:
determining a second energy demand of the local distribution network;
in accordance with a determination that the second energy demand does not exceed the distribution limit, transmitting an indication to charge the electric vehicle via the external interface of the local distribution network.

7. The method of claim 1, wherein determining the energy demand comprises estimating the energy demand of the local distribution network.

8. The method of claim 7, wherein the energy demand is estimated based on time, weather, geography, demand pattern, forecasts, historical data, or any combination therefor.

9. The method of claim 1, wherein the consumption priority is determined based on a state of the electric vehicle.

10. The method of claim 1, further comprising:
updating the priority threshold; and
in accordance with a determination that the consumption priority is greater than the updated priority threshold, transmitting the indication to provide energy to charge the electric vehicle.

11. The method of claim 1, further comprising:
determining a second consumption priority of an electronic device different from the electric vehicle;
in accordance with a determination that the second consumption priority is greater than the priority threshold, transmitting a second indication to provide energy to the electronic device, wherein the provided energy is different from energy provided via the external interface of the local distribution network; and
in accordance with a determination that the second consumption priority is not greater than the priority threshold, forgoing transmitting the indication to provide energy to the electronic device.

12. The method of claim 11, wherein the first consumption priority is higher than the second consumption priority, the method further comprising in accordance with a determination that the consumption priority is higher than the second consumption priority, transmitting an indication to provide energy to the electric vehicle before providing energy to the electronic device.

13. The method of claim 1, wherein:
the energy demand of the local distribution network is determined at a first time; and
the method further comprises determining a second energy demand of the local distribution network at a second time different from the first time based on the energy demand.

14. The method of claim 1, wherein the energy is provided to a power dispenser for charging the electric vehicle.

15. A system for charging an electric vehicle, comprising:
an energy generation device electrically coupled to a local distribution network, and an electronic device, wherein the electronic device is configured to perform a method comprising:
determining an energy demand of the local distribution network;
determining whether the energy demand exceeds a distribution limit of the local distribution network;
determining a change in energy demand of the local distribution network;
determining whether the change in energy demand exceeds an energy spike limit of the local distribution network; and
in accordance with a determination that the energy demand exceeds the distribution limit and a determination that the change in energy demand exceeds the energy spike limit:
determining a consumption priority of the electric vehicle;
in accordance with a determination that the consumption priority is greater than a priority threshold, transmitting an indication to provide energy to charge the electric vehicle, wherein the provided energy is different from energy provided from an external interface of the local distribution network; and
in accordance with a determination that the consumption priority is not greater than the priority threshold, forgoing transmitting the indication to provide energy to the electric vehicle.

16. A non-transitory computer readable storage medium storing one or more programs, the one or more programs comprising instructions, which when executed by a system with one or more processors and memory, cause the system to perform a method comprising:
determining an energy demand of a local distribution network;
determining whether the energy demand exceeds a distribution limit of the local distribution network;
determining a change in energy demand of the local distribution network;
determining whether the change in energy demand exceeds an energy spike limit of the local distribution network; and
in accordance with a determination that the energy demand exceeds the distribution limit and a determination that the change in energy demand exceeds the energy spike limit:

determining a consumption priority of an electric vehicle;

in accordance with a determination that the first consumption priority is greater than a priority threshold, transmitting an indication to provide energy to charge the electric vehicle, wherein the provided energy is different from energy provided from an external interface of the local distribution network; and in accordance with a determination that the consumption priority is not greater than the priority threshold, forgoing transmitting the indication to provide energy to the electric vehicle.

* * * * *